United States Patent [19]

Luneau

[11] Patent Number: 4,815,927
[45] Date of Patent: Mar. 28, 1989

[54] INSTALLATION FOR HANDLING AND TRANSFERRING PALLETIZED OR CONTAINERIZED LOADS

[76] Inventor: Gérard Luneau, 1, rue des Gâte-Ceps, 92210 Saint Cloud, France

[21] Appl. No.: 849,978

[22] Filed: Apr. 10, 1986

[30] Foreign Application Priority Data

Apr. 10, 1985 [FR] France ................ 85 05358

[51] Int. Cl.⁴ ............................... B60P 1/04
[52] U.S. Cl. .................... 414/476; 414/347; 414/392
[58] Field of Search ............. 414/341, 344, 347, 389, 414/390, 391, 392, 393, 476

[56] References Cited

U.S. PATENT DOCUMENTS

| | | | |
|---|---|---|---|
| 2,828,027 | 3/1958 | Stevenson et al. | 414/392 X |
| 3,288,315 | 11/1966 | Bigden | 414/476 |
| 3,357,582 | 12/1967 | Wittek | 414/341 X |
| 3,662,906 | 5/1972 | Christensen | 414/390 |
| 3,704,798 | 12/1972 | Carpenture, Jr. et al. | 414/390 X |
| 3,819,068 | 6/1974 | Weir | 414/392 X |
| 3,952,887 | 4/1976 | Lutz | 414/392 |
| 4,252,495 | 2/1981 | Cook | 414/347 X |
| 4,403,803 | 9/1983 | Szendrodi et al. | 414/390 X |
| 4,425,069 | 1/1984 | Saur et al. | 414/347 X |
| 4,595,331 | 6/1986 | Thompson et al. | 414/347 |

FOREIGN PATENT DOCUMENTS

| | | | |
|---|---|---|---|
| 62342 | 10/1982 | European Pat. Off. | 414/344 |
| 2706986 | 8/1978 | Fed. Rep. of Germany | 414/392 |
| 1064444 | 12/1953 | France | 414/389 |
| 296606 | 1/1969 | U.S.S.R. | 414/391 |
| 1094823 | 5/1984 | U.S.S.R. | 414/390 |

OTHER PUBLICATIONS

Durakool, Reasons to Look Into Durakool Mercury Switches.

Primary Examiner—Peter A. Aschenbrenner
Assistant Examiner—Thomas A. Rendos
Attorney, Agent, or Firm—William A. Drucker

[57] ABSTRACT

A process and installation for transferring pallets for loading (or unloading) a commonplace vehicle, in which trucks, coupled together in rows, are deployed under the load from an accumulation machine, loading then being effected by raising the elevator means of said trucks, followed by a translational movement of the rows in the axis of the vehicle. Then the loads are set down by controlling, from the accumulation machine, lowering of said elevation means then return of the rows of trucks into the accumulation machine.

8 Claims, 5 Drawing Sheets

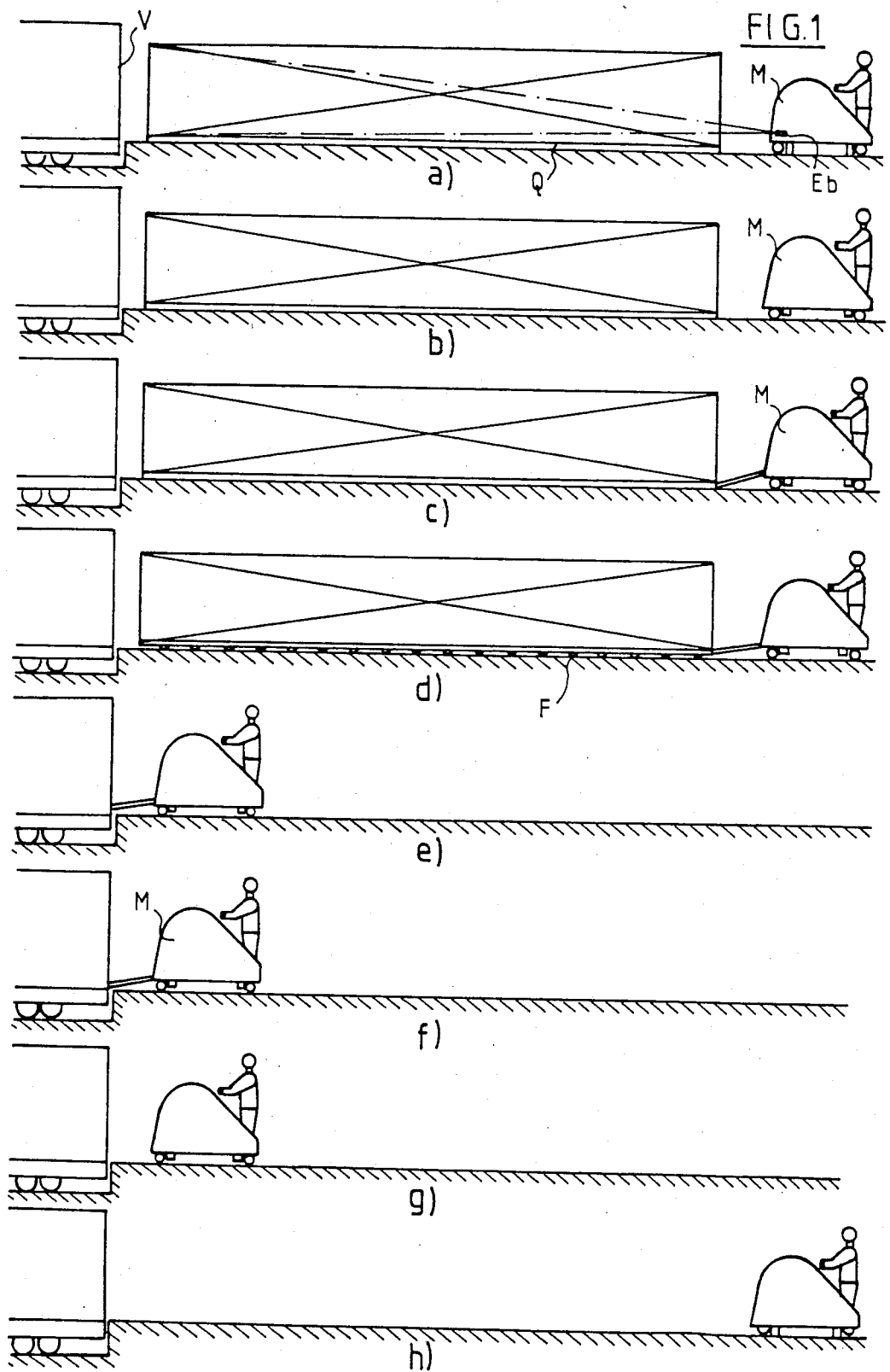

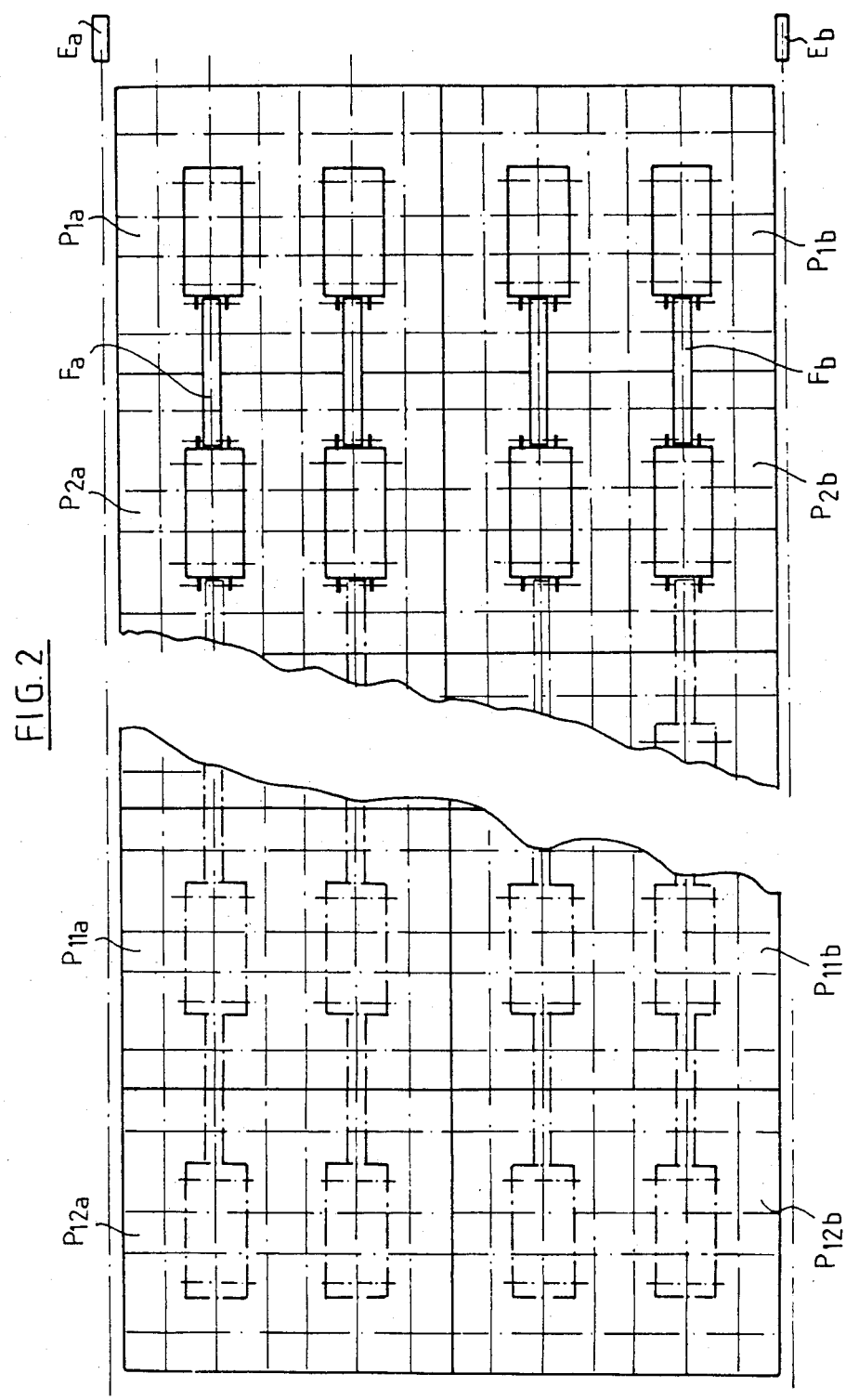

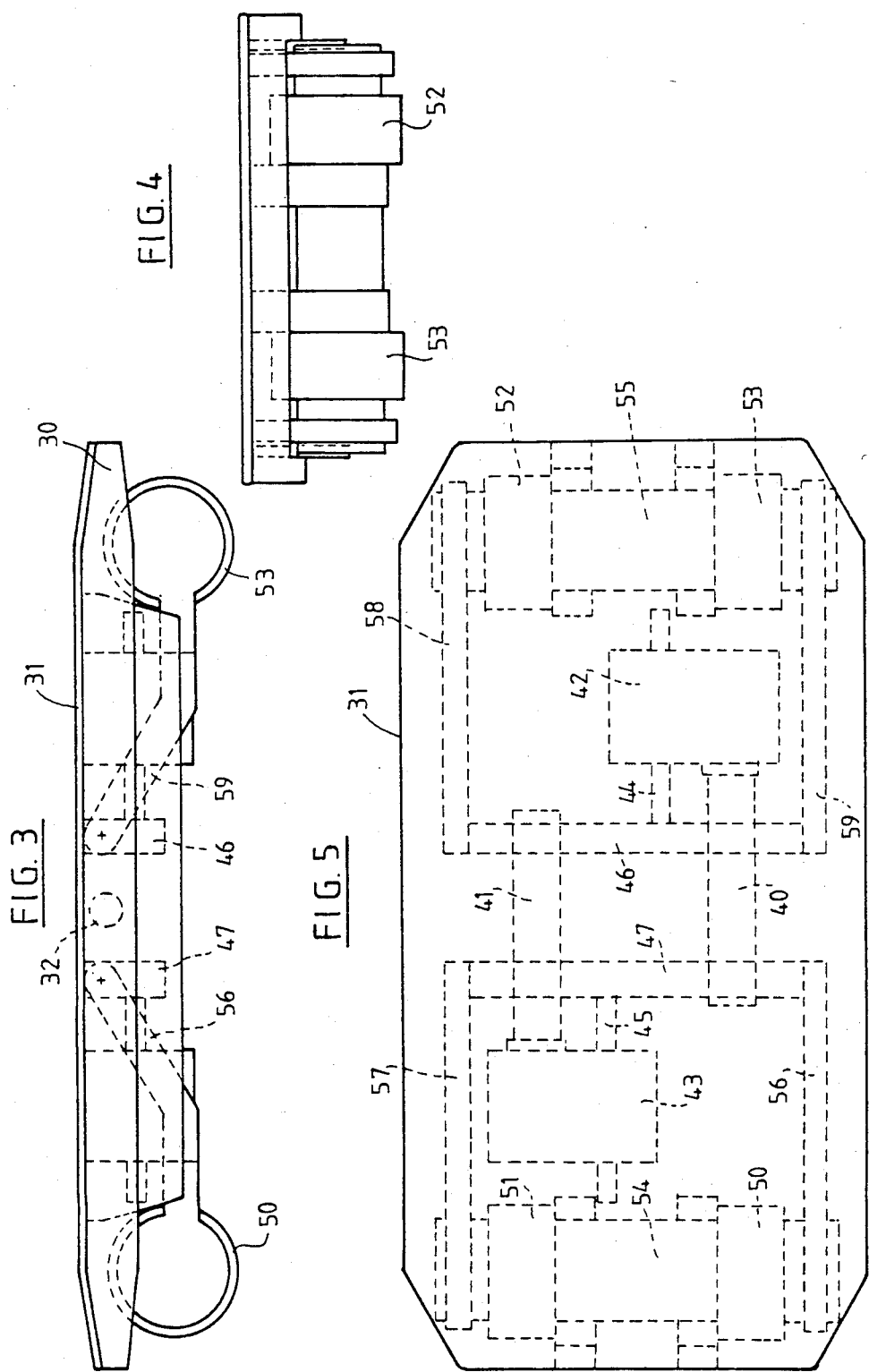

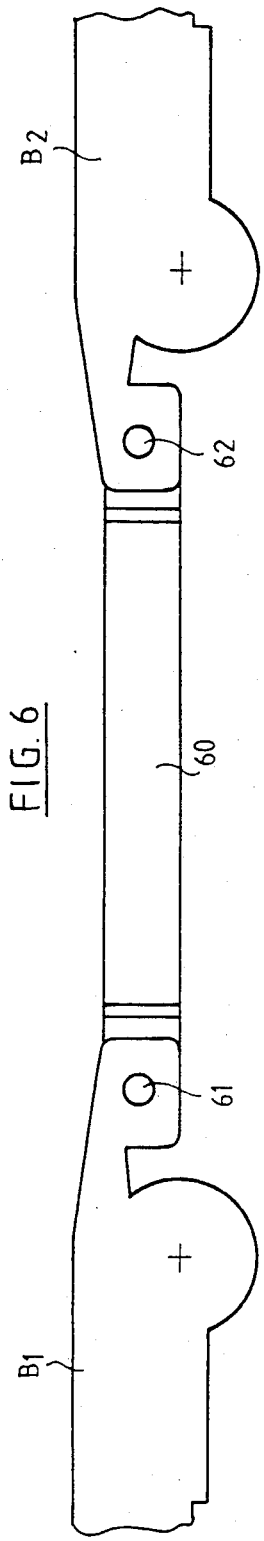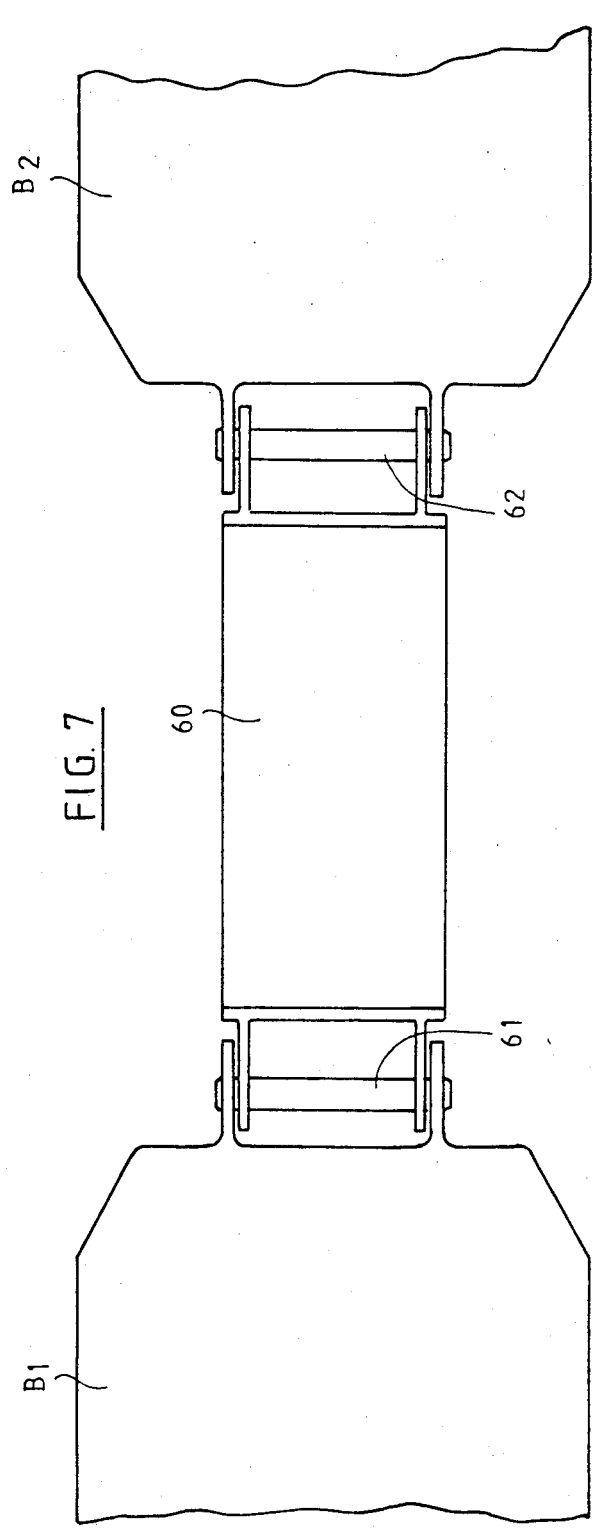

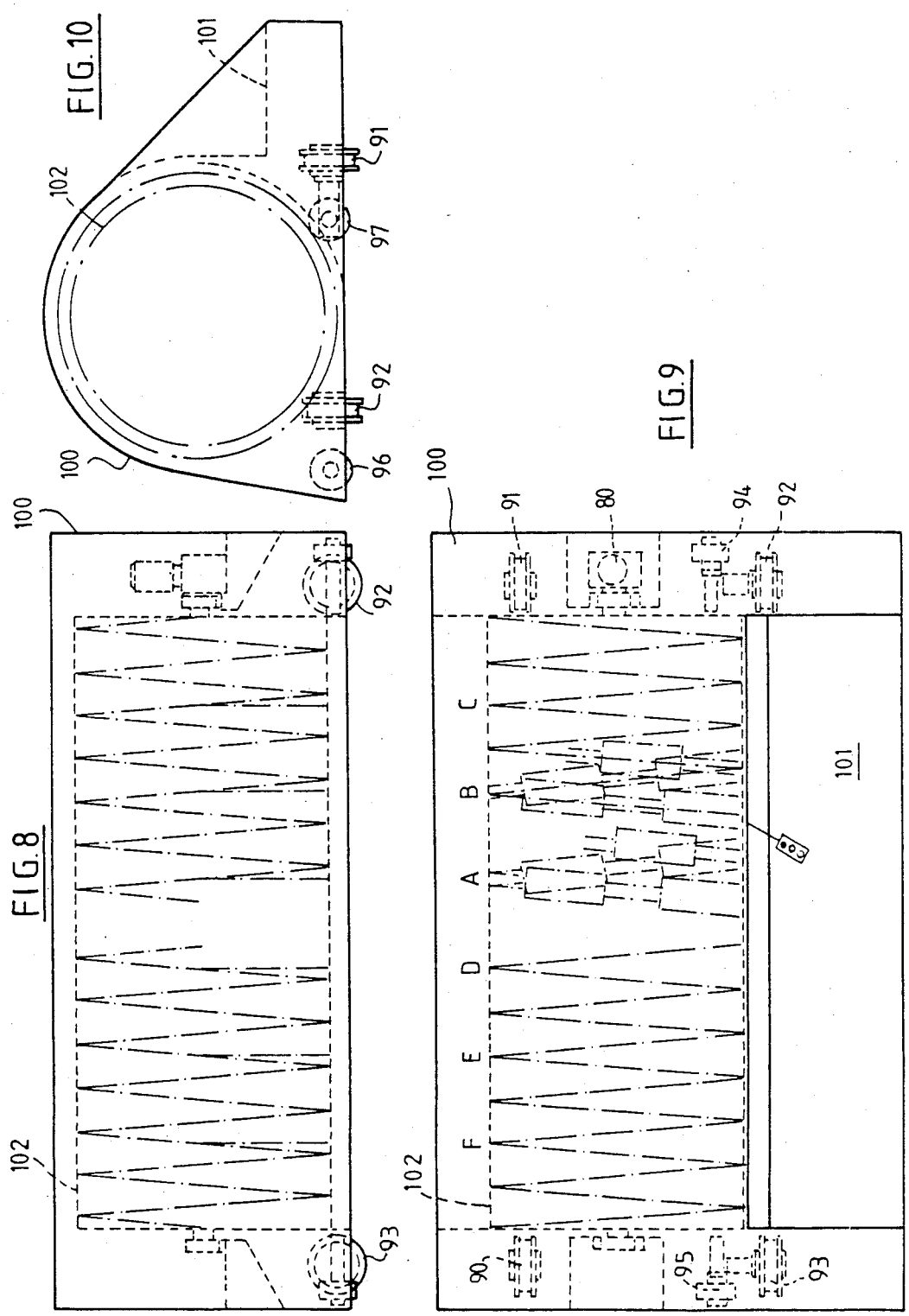

INSTALLATION FOR HANDLING AND TRANSFERRING PALLETIZED OR CONTAINERIZED LOADS

BACKGROUND OF THE INVENTION

The invention relates to installations for loading trains of pallets or containers with feet on a truck or other commonplace vehicle and unloading of the vehicle, without the loading or unloading quay having to be provided with specialized equipment.

A known solution for transferring such loads consists in using a fork lift having a fork which slides under the load, raises and moves it. Since the fork lift only transports one or two loads at a time, this solution is time consuming and expensive.

Another device, known under the name of "cake slice" comprises a conveyor with small diameter rollers which advances cantilever fashion over the vehicle to be loaded, then retracts from under the load while maintaining the load on the vehicle. Such a device can only load at a small distance and loads the vehicle from the sides. It cannot serve for unloading.

Known devices comprising air cushions or air jets require appropriate equipment on the floor of the vehicle to be loaded. The same goes for known devices comprising rolling platforms or conveyors.

Finally, for stacking bridge devices, which bring stacks of pallets on each side of the vehicles, these vehicles must be able to be opened on their large sides.

SUMMARY OF THE INVENTION

The invention proposes overcoming these drawbacks of known devices and providing an installation which allows relatively rapid loading or unloading while occupying a relatively small amount of room on the quay and allowing loads to be conveyed over a floor which may have irregularities forming obstacles to rolling.

According to the invention, this result is obtained by a method which comprises using a self propelled truck having an elevator means adapted for sliding under the load in order to raise it, said truck being adapted to come into position under the load and comprises means for coupling to identical trucks so as to form linear rows of trucks; an accumulation machine is adapted for storing a predetermined number of linear rows in superimposed or, preferably, juxtaposed layers, said machine being provided with self contained moving means and means for positioning it with respect to the loads and for checking the dimensions thereof, which method comprises successively:

checking the positioning of the loads so that they cover an elongate storage strip whose length corresponds to that of a row of trucks and whose width corresponds to that of the space occupied by said rows of trucks when they are deployed from said accumulation machine, the axis of said strip coinciding with that of a vehicle to be loaded or unloaded or that of any other transfer area;

positioning of the accumulation machine filled with said rows of trucks behind the loads thus prepared and in the axis of said strip;

removal of the rows of trucks from the accumulation machine and positioning thereof under the loads, by controlling the actuation of the motors of said trucks;

placing the elevator means of the trucks in a high position for raising the loads;

the simultaneous movement, forwards for loading, rearwards for unloading, in the axis of said strip, of the assembly of rows of loaded trucks and of the accumulation machine; and after the transfer, placing the elevator members of the trucks again in the low position and reintroduction of the rows of trucks into the accumulation machine.

Another object of the invention is to provide a truck, an accumulation means and means for coupling the trucks in rows, specially designed and adapted for putting said method into practice.

Its different features, as well as advantages, will be clear from the following description.

BRIEF DESCRIPTION OF THE DRAWINGS

In the accompanying drawings:

FIG. 1 illustrates the respective phases for putting the method into practice;

FIG. 2 is a schematical top view of an assembly of pallets positioned for transferring them;

FIGS. 3 to 5 show a preferred embodiment of a truck, respectively in elevation, seen in an end view and in a top view;

FIGS. 6 and 7 show schematically a preferred embodiment of the coupling means between two trucks; and FIGS. 8 to 10 show schematically a preferred embodiment of the machine for accumulating rows of trucks, respectively seen in elevation, in a top view and in a side view.

DESCRIPTION OF THE PREFERRED EMBODIMENTS

The first phase of the method is the preparation of the loads.

FIG. 2 shows an assembly of two trains ($P_{1a}$ to $P_{12a}$ and $P_{1b}$ to $P_{12b}$) of twelve pallets each (only the endmost pallets of the trains can be seen in the drawing). The example considered, for illustrating the method, is that of standardized pallets having overall dimensions of 1000×2000 mm. The two juxtaposed trains form a frontage having a dimension of 240 cm and are, for example, intended to be loaded in a vehicle (V, FIG. 1) of a width of 244 cm, whose loading surface is at the level of quay Q on which said assembly has been arranged. Once the pallets are properly arranged, the positioning and dimensions thereof must be checked.

For this, two laser transmitters ($E_a$ and $E_b$, FIG. 2; only $E_b$ is shown in FIG. 1) emit two parallel beams sweeping two respective parallel vertical planes which define the storage strip. (In the example considered, this strip has a width of 240 cm and said planes will be spaced apart by 2420 mm±10 mm from each other). The laser sweep checks that the accumulation machine M is correctly positioned, so as to be able to deploy the rows of trucks in the axis of the storage strip, and that this latter axis itself coincides with that of the vehicle. It also allows the dimensions of the assembly of loads to be checked.

The shell 100 of the machine, as shown in FIG. 10, comprises advantageously at the rear an adjustable running board 101 which allows the operator to have his eyes at about 230 cm from the ground, so as to overlook the load and see if the laser beams illuminate the bottom of the vehicle.

FIG. 1 shows at (a), the machine M positioned behind the load, facing the vehicle. Said machine is provided with self contained means for moving it transversely in the horizontal direction, i.e. parallel to the width of the storage strip. At (b), it is assumed that such a movement has brought machine M into the axis of said strip and of the vehicle. The phase illustrated at (c) corresponds to the deployment of the rows of trucks which are inserted in the entries of the pallets, i.e. the passages between the upper surface thereof and the cross pieces which join the feet together. Since the pallets have two free entries on their faces perpendicular to the axis of the strip, in FIG. 2 two rows of trucks have been shown for each pallet train.

The operator then controls, from his station on the machine, raising of the upper platforms of the pallets by means of the elevator members of the trucks, phase illustrated at (d) in FIG. 1. This control could as a variant be automatic.

Then (phase finished at (e)), he controls the simultaneous translation of the rows of loaded trucks and of the machine at the same speed, which may for example be of the order of 6 to 12 m/min, for obtaining an outward and return travel of the head truck (namely having a distance of 24 m) in 4 to 2 minutes.

The rows of loaded trucks are thus positioned on the loading surface of the vehicle, whereas machine M remains on the quay. During phase (f), the operator lowers the upper platforms of the pallets so as to set down the load, following which (in phase g) he controls the return of the rows of trucks into the shell. Finally (phase (h)), the machine thus loaded is returned to a position ready for loading or unloading.

The operation for unloading the truck follows a procedure of the same kind but, of course, introduction under the load and raising of the load take place on the loading surface of the vehicle and the load is set down on the quay.

The truck, of the bogie kind, shown in FIGS. 3 to 5 comprises a chassis 30 supporting a platform 31 and four wheels 50 to 53 (made advantageously from plastic material) whose wheels 50 and 52 are, for example, free wheels, wheels 51 and 53 being driving wheels and being driven by motors 54-55 respectively. On the shafts of wheels 50 to 53 are mounted for free rotation links 56 to 59 whose upper ends are applied under the platform 31.

The drive is provided by two motors 40, 41 through reducers 42-43 which comprise a device, known per se, for transforming the rotational movement into a slow translational movement of shafts 44-45 respectively. Shafts 44-45 are integral with respective cross pieces 46-47 whose translation, in the appropriate direction, causes the end of the respective pairs of links to be raised, which thus raise platform 31 when motors 40-41 are actuated in the appropriate direction of rotation. Reverse rotation of the motors causes lowering of the links and of the platform. Motors 40-41 and 54-55 are supplied with power and controlled from the machine M.

With the free passage height of a pallet, in the example considered, equal to 100 mm, the height of the bogies will be fixed for example at 75 mm. When the bogies rest on the ground, the upper platform of the pallet to be raised is at 122 mm from the ground. If a lift of 35 mm is required, that means that the platform of the bogie will have to be lifted by 122+35−75=80 mm. For the bogies of the endmost rows ($F_a$ and $F_b$, FIG. 2) the platform will be raised by 39-40 mm instead of 35. The purpose of this feature is to create a horizontal force towards the axis of the overall loads and to prevent lateral displacement of the palletized products.

So as to be able to pass into the free entries of the pallets, the bogies will for example have an overall width of 220 mm. The between axis distance of the front and rear wheels will be determined so that they rest on the ground, without the risk of mounting on a cross piece. However, the bogie will advantageously be provided with a means for controlling the horizontal position of the platform and for cutting off the power supply to the lifting motors 40-41 as soon as the slope of the platform exceeds for example 2.5°. The construction of such means, symbolized by a circle 32 in FIG. 3, is within the scope of a man skilled in the art.

Advantageously, the front face of the head bogies will be equipped with cutting blades (not shown) for opening the passage for the rows of bogies under the pallets enveloped in a protective film.

In FIGS. 6 and 7 have been shown the coupling means between successive bogies $B_1$, $B_2$ in a schematical view.

They are "hyphens" or links 60 connected to the ends of the bogies for pivoting about horizontal pins 61-62 for allowing the rows of bogies to be arranged in the shell of the machine M and so as to confer on the rows of bogies the flexibility required for getting over obstacles, such as surface irregularities or differences of levels between connecting quays.

On the contrary, the hyphen or link must be adapted so as to confer a linear rigidity on the rows of bogies so that their deployment under the pallet train and towards the vehicle to be loaded takes place without diverging appreciably with respect to the axis defined by the laser beams.

Another function of the coupling means is to incorporate, for, protecting them, the power supply and control circuit for the bogie motors. These circuits, not shown, but the design of which is within the reach of the skilled man, are in the form of electric conductors or flexible fluid pipes which extend from the machine M and are housed in the links and in the chassis of the bogies.

It will finally be noted that, for a predetermined bogie length, the length of the links will be chosen so that the centers of the bogies coincide with those of the loads.

In FIGS. 8 to 10 has been shown schematically a cylindrical drum 102 housed in the shell 100 of the machine and rotated about a horizontal shaft by a motor-reducer assembly 80.

The tail end bogies of the rows are hitched by means not shown at four or six of the fastening points A—B—C—D—E—F spaced apart along a generatrix of the drum. Rotation of the drum causes the last six bogies of the row and their coupling means to be wound over a helical portion of the surface of the drum during a first complete revolution thereof. During a second revolution, the first six bogies of each row are wound on a second helical strip portion of the surface of the drum which follows the preceding one. In fact, the row does not completely occupy two complete drum revolutions, which avoids interference with the winding of the adjacent row, whose two strip portions are juxtaposed with those of the preceding row and of the following row.

As shown in FIG. 9, the rows ABC, on the one hand, DEF on the other are slanted in opposite directions and are disposed symmetrically with respect to the median plane of symmetry of the drum perpendicular to its axis. With this arrangement, in the case of deformation, the rows during their redeployment on the ground, will tend to converge towards the loading axis, thus improving the stability of the overall load.

The motor 80 of the drum only serves for rotating the proper mass thereof, the motors of the bogies driving these latter not only for the entrance but also for the exit of the rows of bogies: the bogies rest on zones of adhesion situated on the surface of the drum or on the bottom of the shell 100.

The self propelled movement of the machine in the axial direction uses four wheels 90-93 controlled by the motor-reducers 94-95, whereas its self propelled movement in the lateral direction for positioning same uses four wheels such as 96-97.

It goes without saying that numerous modifications and variants may be conceived and put into practice by a man skilled in the art, without departing from the scope and spirit of the invention.

What is claimed is:

1. A system for transferring unit loads having a substantially plane upper bearing surface above ground-engaging support means from a first to a second predetermined loading or unloading area on which the unit loads are mutually juxtaposed for forming at least one generally rectangular row, said system comprising a plurality of self-propelled elongate trucks rolling on the ground and coupled together through coupling means to form at least one self-propelling train substantially parallel to their longer dimension and of a length not exceeding that of said row, each truck having a lifting platform having a lowered position in which it is engaged under the upper bearing surface of a unit load and a raised position in which it supports said unit load, each truck further having motor means for driving it in a translational motion and further motor means for raising and lowering the lifting platform, said system further comprising a self-propelled accumulation machine for storing a plurality of said trains, said machine comprising motor means for driving it in first and second mutually perpendicular directions, control means for controlling the motor means of the respective trucks for deployment of said trains out of the machine along the loading area to engage the respective trucks under the upper platforms of the unit loads, for controlling the further motor means of the respective trucks to raise the lifting platforms thereof and for controlling the further motor means of the respective trucks to lower the lifting platforms thereof and for controlling the motor means of the respective trucks for re-entrance of said trains in said machine.

2. A system as claimed in claim 1, wherein said accumulation machine further comprises means for emitting two laser beams making two respective sweeps in two parallel vertical planes which define said loading and unloading areas.

3. A system as claimed in claim 1, wherein said accumulation machine comprises an elongate rotary cylindrical drum and means for attaching said trains of trucks at points spaced apart along a generatrix of the cylindrical drum, said trains being wound on said drum in helical juxtaposed strips.

4. A system as claimed in claim 1, wherein each said truck has first and second wheel pairs respectively rotating about first and second axes and said lifting platform has first and second link pairs mounted at one end for free rotation about the respective axes, the opposite ends of the links of said pairs bearing against said lifting platform and first and second crosspieces respectively bearing against the two links of the respective pairs, said further motor means effecting a translational displacement of said cross-pieces.

5. A system as claimed in claim 4, wherein each wheel pair has a left and a right wheel, the right wheel of the first pair and the left wheel of the second pair being driving wheels, whereas the left wheel of the first pair and the right wheel of the second pair are free wheels.

6. A system as claimed in claim 1, wherein said coupling means comprise link means mounted for vertical pivoting at the respective ends of the consecutive trucks of the train and are so arranged that once the train is deployed, a linear rigidity thereof is ensured so as to avoid angular deviations with respect to the axis of the train, whereas a predetermined vertical mobility is provided.

7. A system as claimed in claim 6, wherein each truck has a predetermined length, whereas the length of the coupling means is chosen such that the centers of the trucks coincide with those of the unit loads.

8. A system as claimed in claim 1, wherein each said trucks has means for checking the slope of the lifting platform with respect to a horizontal plane and for cutting off the power supply of said further motor means each time said slope exceeds a predetermined angle.

* * * * *